United States Patent Office 2,712,716
Patented July 12, 1955

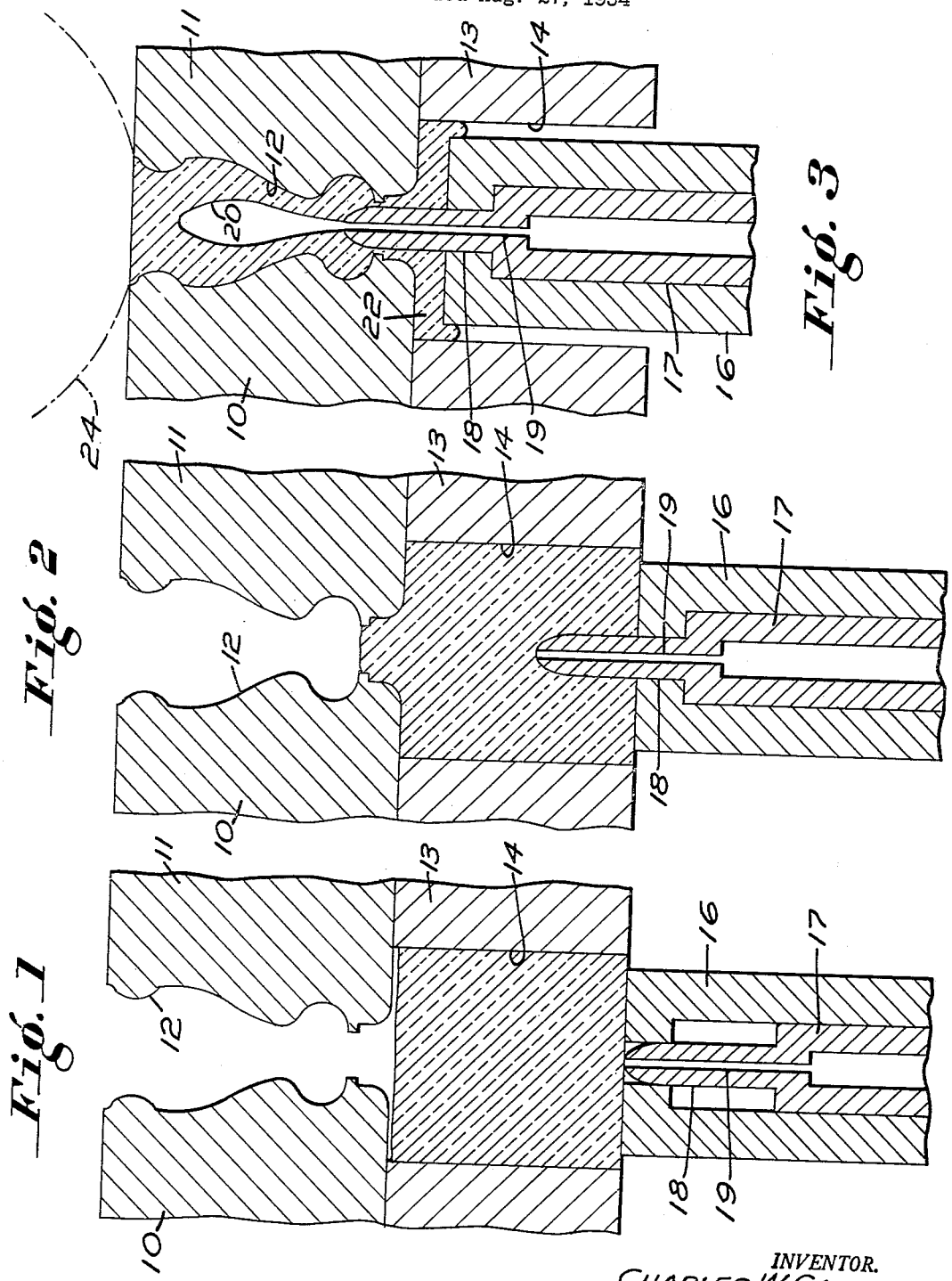

2,712,716

APPARATUS FOR PRODUCING GLASSWARE

Charles W. Carlson, Tiffin, Ohio

Application August 27, 1954, Serial No. 452,561

4 Claims. (Cl. 49—65)

This invention relates to a novel apparatus for producing decorative glass articles such as goblets and other stemware and more particularly to an apparatus whereby glass stemware and similar decorative articles may be formed with internal bubbles or teardrops of predetermined size, form and disposition.

It has long been recognized as desirable in the glass making art to produce decorative glass articles containing internal voids of substantial size known in the art as bubbles or teardrops. These bubbles must be controlled so as to be reasonably regular and uniform in size, shape and location, to produce the desired decorative appearance, and the production of articles of this nature in the hand glass making art has long been recognized as difficult and attended by numerous problems. Previous methods of producing stemware containing bubbles have been notoriously laborious, expensive and time-consuming.

In the manufacture of high quality stemware the general and usual practice is to press glass in a mould against the bottom of a hand blown bowl to form a stem. The present invention provides an apparatus whereby the bubble may be produced in the stem in the course of the pressing operation. In using the apparatus of the present invention the void or bubble in a glass stem is initially produced by projecting a piercing instrument axially into the lower end of the stem and thence blowing to enlarge and extend the opening thus initiated.

In a preferred form of the apparatus of the present invention the piercing tool enters from the lower end of the stem and the opening left when the piercing and blowing tool is withdrawn is subsequently closed by the normal and usual operation of casting a foot against the lower end of the pressed stem.

While certain variations in the apparatus for producing stemware containing voids or bubbles therein may be effectuated without departing from the underlying principles of the present invention, the following specification describes in detail a preferred form. However, it is to be understood that the spirit and scope of the present invention are not limited precisely thereto nor otherwise than as defined in the appended claims.

In the drawing:

Fig. 1 is a general vertical cross-sectional view through one form of pressing, piercing and blowing apparatus for forming a glass stem having a central void or bubble therein, the parts being shown in an initial position of operation;

Fig. 2 is a view similar to Fig. 1 but showing a further position of operation; and Fig. 3 is a view similar to Figs. 1 and 2 but showing a still further position of operation.

Like characters of reference denote like parts in the several figures of the drawing and the numerals 10 and 11 designate the complementary halves of a conventional stem mold for producing pressed stems for glassware articles such as goblets and other stemware. In the drawing the stem molding cavity is designated 12.

A block 13 contains a vertical cylindrical cavity or opening 14 therethrough and is movable horizontally to underlie the stem cavity 12 axially as shown in the drawings and is also movable to a position where its upper surface is clear of the stem mold parts 10 and 11. In the latter position a charge of molten glass may be deposited in the cavity or opening 14 from the top.

A pair of coaxial plungers 16 and 17 normally underlie the cavity 14 of block 13 and cooperate to provide a bottom for such cavity during the filling thereof with a charge of molten glass. The outer plunger 16 and inner plunger 17 are relatively movable axially with respect to each other and with respect to block 13. The inner plunger 17 has a reduced upper piercing portion 18 provided with an axial bore 19 for conducting blowing air through the upper end thereof in a manner which will presently appear.

After block 13 with plungers 16 and 17 is moved to a position directly underlying stem mold 10, 11, inner plunger 17 is moved upwardly to the position shown in Fig. 2 where the upper end of its main body portion meets the upper end of the larger internal bore portion of outer plunger 16 and further upward movement of the inner plunger 17 carries with it outer plunger 16 which ejects molten glass from cavity 14 upwardly into stem mold 10, 11. This brings the plunger parts to the position clearly illustrated in Fig. 3 and controlled introduction of blowing air upwardly through the bore 19 of inner plunger 17 forms the hollow bubble designated 20 in Fig. 3.

Following the blowing operation the plungers are retracted and the extraneous glass remaining in cavity 14, such glass being designated 22 in Fig. 3, is broken away from the molded or pressed stem proper.

The manner in which the stem is applied to a hand blown bowl is entirely conventional, although it is done as an incident to the stem casting or pressing operation. The artisan applies a blown bowl attached to a blow pipe to the upper surface of the stem mold parts at the upper end of cavity 12, so that the casting or pressing of the stem applies the stem directly against the bottom of the blown bowl. Such a bowl is indicated schematically at 24 in Fig. 3.

After the pressed stem and its attached bowl are removed from the apparatus by separation of the stem mold parts 10 and 11, a foot is applied to the bottom of the pressed stem in the usual manner, such application serving automatically to close off the bottom of the bubble 20. Any necessary "warming in" or reheating of the stem as may be necessary or desirable may be practiced, just as in prior art methods.

What is claimed is:

1. Apparatus for forming glass stemware comprising a pair of separable mold parts forming a stem molding cavity open at both ends, means including an open ended charge receiving chamber movable to dispose one end thereof against one end of said stem molding cavity, a pair of coaxial inner and outer plungers positioned adjacent to the other end of said charge receiving chamber and movable axially toward said one end thereof, said outer plunger serving as means for transferring molten glass from the charge receiving chamber to the stem molding cavity and said inner plunger being adapted to pierce the glass in the stem molding cavity axially, and means for blowing air through said inner plunger to enlarge the opening formed by piercing and form a bubble in said stem.

2. Apparatus for forming glass stemware comprising a pair of separable mold parts forming a stem molding cavity having an open end, means including an open ended cylindrical charge receiving chamber movable to dispose one end thereof against said open end of the stem molding cavity, a pair of coaxial inner and outer plungers positioned adjacent to the other end of said charge receiving chamber and movable axially therethrough, said outer plunger serving as means for transferring molten glass from the charge receiving chamber to the stem molding cavity and said inner plunger being adapted to pierce the glass in the stem molding cavity axially, and means for blowing air through said inner plunger to enlarge the opening formed by piercing and form a bubble in said stem.

3. Apparatus for forming glass stemware comprising a pair of separable mold parts forming a vertical stem molding cavity open at both ends, means forming a charge receiving chamber movable laterally to and from a position underlying said stem molding cavity, the bottom of said chamber means having a pair of coaxial inner and outer plungers movable upwardly therein, said outer plunger serving as means for transferring molten glass from the chamber means to the stem molding cavity and said inner plunger being adapted to pierce the glass in the stem molding cavity axially, and means for blowing air through said inner plunger to enlarge the opening formed by piercing.

4. Apparatus for forming glass stemware comprising a pair of separable mold parts forming a vertical stem molding cavity open at its lower end, means forming a charge receiving chamber movable laterally to and from a position underlying the open lower end of said stem molding cavity, the bottom of said chamber means having a pair of coaxial inner and outer plungers movable upwardly therein, said outer plunger serving as means for transferring molten glass from the chamber means to the stem molding cavity and said inner plunger being adapted to pierce the glass in the stem molding cavity axially, and means for blowing air through said inner plunger to enlarge the opening formed by piercing.

References Cited in the file of this patent
UNITED STATES PATENTS

| | | |
|---|---|---|
| 704,760 | Schaub | July 15, 1902 |
| 2,333,745 | Schwarz | Nov. 9, 1943 |